(12) United States Patent
Keskitalo et al.

(10) Patent No.: US 11,570,664 B2
(45) Date of Patent: Jan. 31, 2023

(54) LINK MONITORING WITH SELF-BACKHAULING FOR WIRELESS NETWORKS

(71) Applicant: Nokia Technologies Oy, Espoo (FI)

(72) Inventors: Ilkka Keskitalo, Oulu (FI); Esa Tiirola, Kempele (FI)

(73) Assignee: Nokia Technologies Oy, Espoo (FI)

(*) Notice: Subject to any disclaimer, the term of this patent is extended or adjusted under 35 U.S.C. 154(b) by 21 days.

(21) Appl. No.: 16/768,824

(22) PCT Filed: Nov. 16, 2018

(86) PCT No.: PCT/FI2018/050838
§ 371 (c)(1),
(2) Date: Jun. 1, 2020

(87) PCT Pub. No.: WO2019/110869
PCT Pub. Date: Jun. 13, 2019

(65) Prior Publication Data
US 2021/0176670 A1    Jun. 10, 2021

Related U.S. Application Data

(60) Provisional application No. 62/594,435, filed on Dec. 4, 2017.

(51) Int. Cl.
*H04W 36/00* (2009.01)
*H04W 76/10* (2018.01)
(Continued)

(52) U.S. Cl.
CPC ........ *H04W 36/0011* (2013.01); *H04B 7/155* (2013.01); *H04L 5/0048* (2013.01);
(Continued)

(58) Field of Classification Search
CPC ... H04B 7/15528; H04B 7/155; H04W 24/08; H04W 88/04; H04W 84/047;
(Continued)

(56) References Cited

U.S. PATENT DOCUMENTS 9,344,948 B2 * 5/2016 Li ................. H04W 36/22
2009/0042616 A1 * 2/2009 Teo ................ H04B 7/0691
455/562.1

(Continued)

FOREIGN PATENT DOCUMENTS

GB       2503923 A      1/2014
WO    2017/039505 A1    3/2017

OTHER PUBLICATIONS

"New WID on New Radio Access Technology", 3GPP TSG RAN Meeting #75, RP-170847, Agenda : 9.1, NTT Docomo Inc., Mar. 6-9, 2017, 8 pages.

(Continued)

*Primary Examiner* — Yee F Lam
(74) *Attorney, Agent, or Firm* — Brake Hughes Bellermann LLP

(57) ABSTRACT

A technique includes sending, by a relay node to a candidate base station via a base station-to-base station connection, a request for transmission of reference signals, wherein the base station-to-base station connection includes, at least in part, a wireless connection; receiving, by the relay node from the candidate base station, a reference signal configuration; and measuring one or more signal parameters of one or more received reference signals based on the received reference signal configuration.

20 Claims, 10 Drawing Sheets

(51) Int. Cl.
*H04W 24/08* (2009.01)
*H04W 36/08* (2009.01)
*H04B 7/155* (2006.01)
*H04L 5/00* (2006.01)

(52) U.S. Cl.
CPC .......... *H04W 24/08* (2013.01); *H04W 36/08* (2013.01); *H04W 76/10* (2018.02)

(58) Field of Classification Search
CPC ... H04W 36/305; H04W 92/20; H04W 36/08; H04W 76/10; H04W 76/19; H04W 48/20; H04W 36/0011; H04W 36/0088; H04W 24/10; H04W 36/0094; H04W 8/22; H04W 36/22; H04W 36/0016; H04W 36/0058; H04W 36/30; H04L 5/0091; H04L 5/0048
See application file for complete search history.

(56) References Cited

U.S. PATENT DOCUMENTS

| | | | | |
|---|---|---|---|---|
| 2010/0188982 A1* | 7/2010 | Kato | ................. | H04W 56/0045 370/242 |
| 2012/0202503 A1* | 8/2012 | Kitaji | ................... | H04W 36/22 455/438 |
| 2012/0315916 A1* | 12/2012 | Van Phan | ............ | H04W 36/08 455/442 |
| 2013/0034035 A1* | 2/2013 | Kazmi | ............. | H04W 56/0085 370/311 |
| 2013/0337811 A1* | 12/2013 | Faerber | ............ | H04W 36/0083 455/436 |
| 2015/0181498 A1* | 6/2015 | Li | ......................... | H04W 36/22 455/437 |
| 2015/0312788 A1* | 10/2015 | Delsol | ................. | H04W 24/10 370/252 |
| 2016/0192439 A1* | 6/2016 | Phuyal | ..................... | H04L 1/08 370/315 |
| 2016/0337916 A1* | 11/2016 | Deenoo | ............ | H04W 36/0088 |
| 2017/0295502 A1* | 10/2017 | Stirling-Gallacher | | ...................... H04B 7/024 |
| 2017/0338923 A1* | 11/2017 | Prasad | ................. | H04L 5/0078 |
| 2018/0063883 A1* | 3/2018 | Nagaraja | ............. | H04W 72/046 |
| 2018/0279181 A1* | 9/2018 | Hampel | ............ | H04W 36/0072 |
| 2018/0323850 A1* | 11/2018 | Baligh | .................. | H04B 7/024 |
| 2019/0036666 A1* | 1/2019 | Li | ........................ | H04W 72/044 |
| 2019/0124696 A1* | 4/2019 | Islam | ................ | H04W 74/0833 |
| 2019/0158319 A1* | 5/2019 | Cezanne | ................ | H04B 17/27 |
| 2019/0174373 A1* | 6/2019 | Kanazawa | ............ | H04W 36/08 |
| 2019/0379509 A1* | 12/2019 | Stauffer | ................ | H04L 5/0053 |

OTHER PUBLICATIONS

"3rd Generation Partnership Project; Technical Specification Group Services and System Aspects;Service requirements for the 5G system; Stage 1 (Release 16)", 3GPP TS 22.261, V16.1.0, Sep. 2017, pp. 1-52.

"New SID Proposal: Study on Integrated Access and Backhaul for NR", 8881123GPP TSG RAN Meeting #75, RP-170821, Agenda : 9.1, AT&T, Mar. 6-9, 2017, 5 pages.

International Search Report and Written Opinion received for corresponding Patent Cooperation Treaty Application No. PCT/FI2018/050838, dated Jan. 21, 2019, 16 pages.

"Forward Compatibility Design for NR Integrated Access andBackhaul", 3GPP TSG-RAN Working Group 2 meeting #96, R2-167632, Agebda : 9.2.3, AT&T, Nov. 14-18, 2016, pp. 1-4.

"Inter-IAB-node discovery", 3GPP TSG RAN WG2 Meeting #102, R2-1808009, Agenda : 11 .1.4, Qualcomm Incorporated, May 21-25, 2018, 7 pages.

Office Action for European Application No. 18808049.3, dated Mar. 28, 2022, 4 pages.

* cited by examiner

US 11,570,664 B2

LINK MONITORING WITH SELF-BACKHAULING FOR WIRELESS NETWORKS

CROSS REFERENCE TO RELATED APPLICATIONS

This application claims the benefit of U.S. Provisional Application No. 62/594435, filed on Dec. 4, 2017. The contents of this earlier filed application are hereby incorporated by reference in their entirety.

RELATED APPLICATION

This application was originally filed as PCT Application No. PCT/FI2018/050838, filed on 16 Nov. 2018, which claims priority from U.S. Provisional Application No. 62/594435, filed on 4 Dec. 2017, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services. BSs in 5G/NR may be referred to as gNBs.

SUMMARY

According to an example implementation, a method includes sending, by a relay node to a candidate base station via a base station-to-base station connection, a request for transmission of reference signals, wherein the base station-to-base station connection includes, at least in part, a wireless connection; receiving, by the relay node from the candidate base station, a reference signal configuration; and measuring one or more signal parameters of one or more received reference signals based on the received reference signal configuration.

According to an example implementation, an apparatus includes at least one processor and at least one memory including computer instructions, when executed by the at least one processor, cause the apparatus to: send, by a relay node to a candidate base station via a base station-to-base station connection, a request for transmission of reference signals, wherein the base station-to-base station connection includes, at least in part, a wireless connection; receive, by the relay node from the candidate base station, a reference signal configuration; and measure one or more signal parameters of one or more received reference signals based on the received reference signal configuration.

According to an example implementation, a computer program product includes a computer-readable storage medium and storing executable code that, when executed by at least one data processing apparatus, is configured to cause the at least one data processing apparatus to perform a method including: sending, by a relay node to a candidate base station via a base station-to-base station connection, a request for transmission of reference signals, wherein the base station-to-base station connection includes, at least in part, a wireless connection; receiving, by the relay node from the candidate base station, a reference signal configuration; and measuring one or more signal parameters of one or more received reference signals based on the received reference signal configuration.

According to an example implementation, an apparatus includes means for sending, by a relay node to a candidate base station via a base station-to-base station connection, a request for transmission of reference signals, wherein the base station-to-base station connection includes, at least in part, a wireless connection; means for receiving, by the relay node from the candidate base station, a reference signal configuration; and means for measuring one or more signal parameters of one or more received reference signals based on the received reference signal configuration.

According to an example implementation, a method includes establishing, by a relay node, a wireless backhaul connection via a serving base station; establishing, by the relay node, a base station-to-base station connection to the candidate base station, wherein the base station-to-base station connection includes, at least in part, a wireless connection;

and initiating a candidate cell measurement procedure with respect to the candidate base station, including: sending, by the relay node to the candidate base station via the base station-to-base station connection, a request for transmission of reference signals; receiving, by the relay node from the candidate base station, a reference signal configuration; and measuring one or more signal parameters of one or more received reference signals based on the received reference signal configuration.

According to an example implementation, an apparatus includes at least one processor and at least one memory including computer instructions, when executed by the at least one processor, cause the apparatus to: establish, by a relay node, a wireless backhaul connection via a serving base station; establishing, by the relay node, a base station-to-base station connection to the candidate base station, wherein the base station-to-base station connection includes, at least in part, a wireless connection; and initiate a candidate cell measurement procedure with respect to the candidate base station, including: send, by the relay node to the candidate base station via the base station-to-base station connection, a request for transmission of reference signals; receive, by the relay node from the candidate base station, a reference signal configuration; and measure one or more signal parameters of one or more received reference signals based on the received reference signal configuration.

According to an example implementation, a computer program product includes a computer-readable storage medium and storing executable code that, when executed by at least one data processing apparatus, is configured to cause the at least one data processing apparatus to perform a method including: establishing, by a relay node, a wireless backhaul connection via a serving base station; establishing, by the relay node, a base station-to-base station connection to the candidate base station, wherein the base station-to-base station connection includes, at least in part, a wireless connection; and initiating a candidate cell measurement procedure with respect to the candidate base station, including: sending, by the relay node to the candidate base station via the base station-to-base station connection, a request for transmission of reference signals; receiving, by the relay node from the candidate base station, a reference signal configuration; and measuring one or more signal parameters of one or more received reference signals based on the received reference signal configuration.

According to an example implementation, an apparatus includes means for establishing, by a relay node, a wireless backhaul connection via a serving base station; means for establishing, by the relay node, a base station-to-base station connection to the candidate base station, wherein the base station-to-base station connection includes, at least in part, a wireless connection; and means for initiating a candidate cell measurement procedure with respect to the candidate base station, including means for: sending, by the relay node to the candidate base station via the base station-to-base station connection, a request for transmission of reference signals; receiving, by the relay node from the candidate base station, a reference signal configuration; and measuring one or more signal parameters of one or more received reference signals based on the received reference signal configuration.

According to an example implementation, a method includes receiving, by a candidate base station from a relay node via a base station-to-base station connection, a request for transmission of reference signals, wherein the base station-to-base station connection includes, at least in part, a wireless connection; sending, by the candidate base station to the relay node, a reference signal configuration; and sending, by the candidate base station to the relay node in response to the receiving the request, reference signals.

According to an example implementation, an apparatus includes at least one processor and at least one memory including computer instructions, when executed by the at least one processor, cause the apparatus to: receive, by a candidate base station from a relay node via a base station-to-base station connection, a request for transmission of reference signals, wherein the base station-to-base station connection includes, at least in part, a wireless connection; send, by the candidate base station to the relay node, a reference signal configuration; and send, by the candidate base station to the relay node in response to the receiving the request, reference signals.

According to an example implementation, a computer program product includes a computer-readable storage medium and storing executable code that, when executed by at least one data processing apparatus, is configured to cause the at least one data processing apparatus to perform a method including: receiving, by a candidate base station from a relay node via a base station-to-base station connection, a request for transmission of reference signals, wherein the base station-to-base station connection includes, at least in part, a wireless connection; sending, by the candidate base station to the relay node, a reference signal configuration; and sending, by the candidate base station to the relay node in response to the receiving the request, reference signals.

According to an example implementation, an apparatus includes means for receiving, by a candidate base station from a relay node via a base station-to-base station connection, a request for transmission of reference signals, wherein the base station-to-base station connection includes, at least in part, a wireless connection; means for sending, by the candidate base station to the relay node, a reference signal configuration; and means for sending, by the candidate base station to the relay node in response to the receiving the request, reference signals.

The details of one or more examples of implementations are set forth in the accompanying drawings and the description below. Other features will be apparent from the description and drawings, and from the claims.

DETAILED DESCRIPTION

Figure 1:
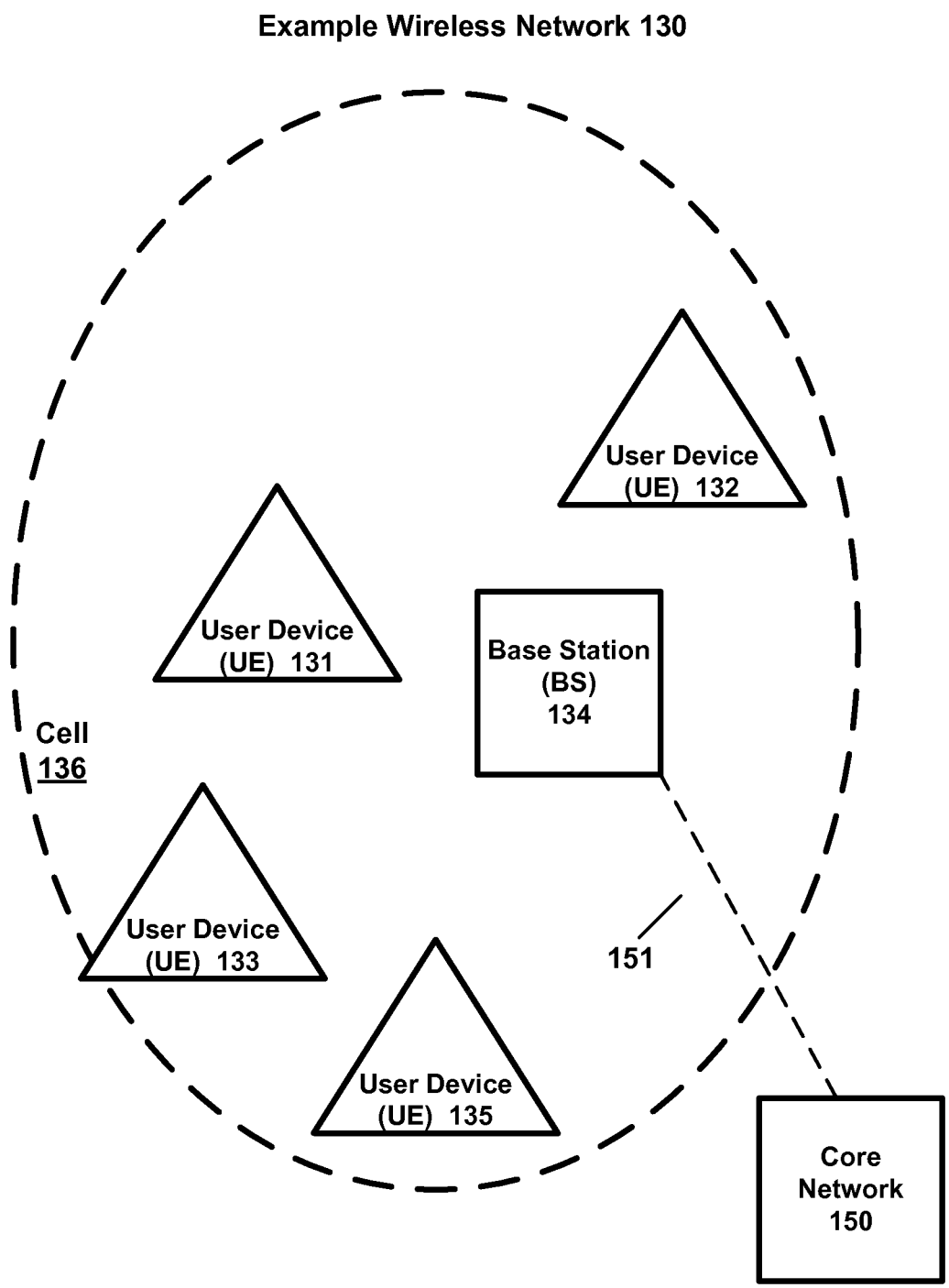
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) or gNB may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

According to an example implementation, some networks may include a relay node (RN), e.g., to improve wireless coverage and ease of deployment. A relay node may be a network node to increase or extend wireless coverage of a network. A RN may be connected to a base station (BS) or gNB, and may also provide wireless services within a cell to one or more connected UEs or wireless subscribers. Also, multi-hop deployment of relay nodes (RNs) may also be provided. In that scenario, UE signal is relayed via multiple RNs, e.g., up-to 4 RNs.

Figure 2:
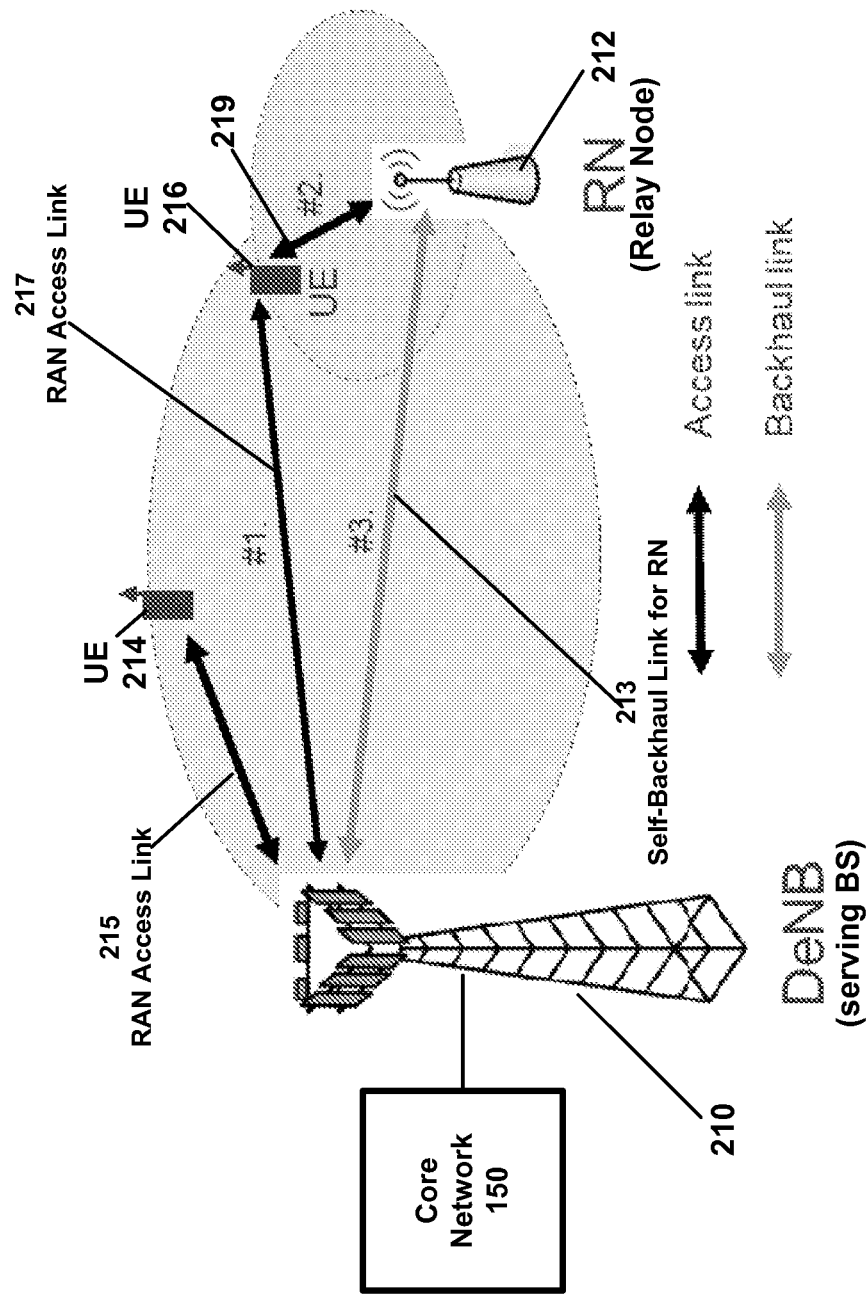
FIG. 2 is a diagram illustrating a wireless network that includes a relay node (RN) according to an example implementation.

FIG. 2 is a diagram illustrating a wireless network that includes a relay node (RN) according to an example implementation. A BS 210 (e.g., donor eNB or serving BS) may be connected (e.g., via wired or wireless connection, and typically a wired connection) to core network 150, and may also provide wireless services to one or more UEs within a cell that are connected to the BS 210. For example, BS 210 may be connected via a radio access node (RAN) (wireless access) link 215 to UE 214, and connected via access link 217 to UE 216.

Also, referring to FIG. 2, a relay node (RN) 212 may be provided, e.g., to extend wireless coverage of the network and/or extend wireless coverage of the BS 210. RN 212 may be connected, via wireless (or radio) backhaul link to a donor gNB (or serving BS) 210. RN 212 may also be connected via a wireless radio access node link 219 to UE 216. In an example implementation, donor gNB or serving BS 210 may share its radio resources with the RN 212, and also serves its own UEs (e.g., UE 214). For donor gNB (serving BS) 210, the RN 212 may appear as a UE (e.g., at least from certain physical layer functionalities point of view). And, for RN 212, the serving BS 210 may appear to RN 212 as a BS (e.g. at least from certain physical layer functionalities point of view). Also, for example, RN 212 may use a same carrier frequency/frequencies (shared frequency resources) for both access link 219 and self-backhaul link 213. Alternatively, RN 212 may use different carrier frequency/frequencies for the access link to UEs, and the self-backhaul link 213 to serving BS 210. Also, according to an example implementation, RN 212 may not have a wired backhaul connection to core network 150, but may typically have a wireless self-backhaul connection (over a wireless connection) to serving BS 210. According to an example implementation, RN 212 may send and/or receive data and/or control signals to serving BS 210 via the backhaul link 213. And, serving BS 210 may forward data and/or control signals (which may be provided or received by BS 210 via the self-backhaul link 213) to/from core network 150. Thus, for example, the wireless self-backhaul link 213 may be used because RN 212 may not typically have a wired backhaul link directly to core network 150, but rather, the RN 212 may establish a backhaul link to core network 150 via another BS (e.g., via serving BS/Donor BS 210, in this example). This link may cover also multiple RNs and multiple backhaul links in the case of multi-hop relaying.

Figure 3:
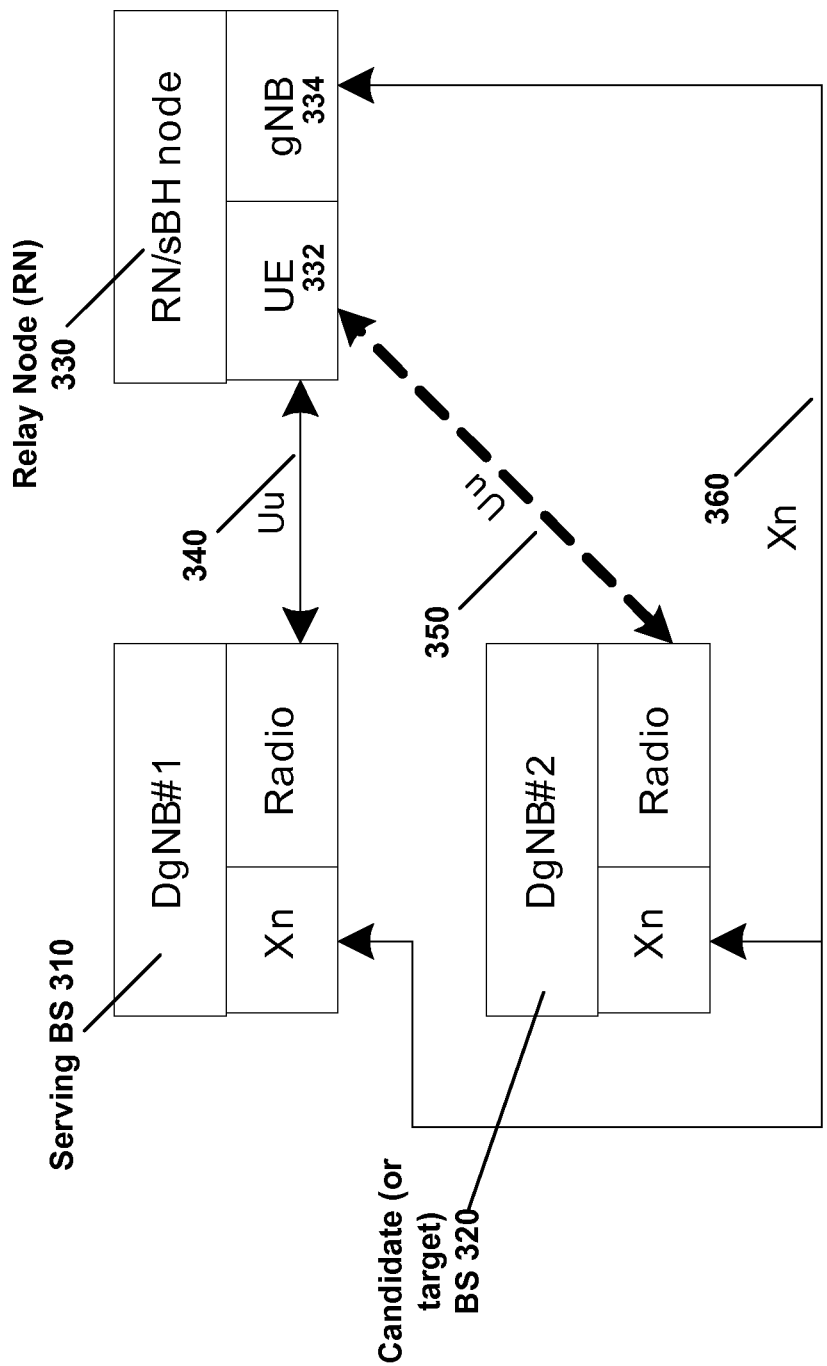
FIG. 3 is a diagram illustrating a wireless network according to an example implementation.

FIG. 3 is a diagram illustrating a wireless network according to an example implementation. As shown in FIG. 3, a serving BS 310, a candidate (or target) BS 320, and a relay node (RN) 330 may be connected or in communication with each other, for example. For example, serving BS 310 may currently be serving RN 330, e.g., a wireless connection may be established between the serving BS 310 and RN 330 (e.g., to provide a self-backhaul link for RN 330). Candidate (or target) BS 320 may be a neighbor BS, and which, for example, may be a candidate (or possible target) for a future handover of the RN self-backhaul link (from serving BS 310 to candidate BS 320, depending on one or more measured signal parameters (e.g., received power) with respect to the candidate BS 320.

According to an example implementation, RN 330 may include a UE part 332, which operates as a UE, e.g., monitoring signals from one or more BSs/cells, sending measurement reports or other signals to a serving BS, establishing a connection to a BS, performing a handover if instructed by the serving BS, etc. A wireless connection may be provided between RN 330 and serving BS 310 over a radio/wireless interface (Uu) 340, over which a self-backhaul link is provided for the RN 330. According to an example implementation, the self-backhaul link may be established between a UE part 332 of RN 330 and a radio interface of serving BS 310.

Also, with reference to FIG. 3, RN 330 may also include a BS part 334 that operates as a BS with respect to one or more UEs, e.g., to provide wireless service to one or more UEs, such as by sending reference signals, synchronization signals, receiving and accepting connection/access requests, allocating and scheduling resources for UEs, etc. A base station-to-base station connection 360 (e.g., Xn or X2 connection) may be provided between RN-BS part 334 (which is the RN part 334 of RN 330), Xn protocol entity of BS 320 and a Xn protocol entity of serving BS 310, e.g., to allow the BS entity 334 of RN 330 to communicate with the serving/donor BS (DgNB#1) 310 and candidate (DgNB#2) BS 320, and to allow BSs 310 and 320 to communicate with each other.

Thus, FIG. 3 illustrates an example of logical functions and interfaces in the scenario where RN 330 (self-backhaul (sBH) node) is connected to a Donor BS/Donor cell (DgNB#1) (serving BS 310) and has a candidate BS/candidate cell to connect to in case the radio/wireless connection between RN 330 and DgNB#1 is lost or fails. For example, the connection from RN 330 to DgNB#1 (serving BS 310) may be lost due to radio blocking (e.g., obstacles moving between the nodes, excessive interference, and the like) and the changes may be very fast, e.g., requiring fast reaction by RN 330 to find an alternative path and resuming the self-backhaul connection from the RN 330 to the core network 150 FIG. 2) via the alternative BS/cell (e.g., via candidate BS 320/DgNB#2).

As shown in FIG. 3, the RN 330 may have two logical functionalities, including UE part 332, and a BS part 334. UE part 332 and BS part 334 will be briefly described.

UE part 332 of the RN 330 (RN-UE part) handles or performs communication with the Donor cell/Donor BS (e.g., serving BS 310) over the radio interface (Uu). The self-backhaul connection (between RN 330 and serving BS 310) is provided or established over the radio/wireless interface (Uu) 340 between the UE part 332 of RN 330 and serving BS 310/Donor BS (DgNB#1). For example, at power-up, the UE part 332 of RN 330 may perform signal measurement of one or more BSs/cells, selecting and accessing the best cell, and establishing (e.g., via cell access or random access procedure) the self-backhaul connection to the best cell/BS (e.g., the cell or BS having a strongest or highest RSRP of received signals, such as a strongest received power based on a received synchronization signal block (SSB), or other measured signal). After the UE part 332 has established a self-backhaul connection to a serving BS 310, the UE part 332 may monitor signals (e.g., SSB and/or channel state information-reference signals) from other/neighbor BSs/cells, and may provide a measurement report (e.g., indicating a better/stronger signal received from a neighbor cell), and then perform a handover or cell reselection of the self-backhaul connection from the serving BS 310 to the candidate BS 320, for example. UE part 332 of RN 330 may also monitor RSRP of different signals (SSB and/or other signals, associated with different beams), and may select a best/strongest beam (e.g., having a strongest or highest RSRP of the SSB or CSI-RS), and then may send a measurement report or may switch cells by attempting cell access using a random access resource associated with the selected beam. Cell/beam monitoring and re-selection in case of changing in the radio connections: Beam measurements/selection, cell evaluation and triggering a handover.

According to an example implementation, a BS (e.g., a 5G BS, which may be referred to as a gNB, or other BS) may transmit a synchronization signal block (SS block, or SSB), which may be received by one or more UEs/user devices. A SSB may include synchronization signal to allow the UE to synchronize to a BS, and perform random access to the BS. In an example implementation, a SS block may include, e.g., one or more or even all of: primary synchronization signals (PSS), secondary synchronization signals (SSS), a physical broadcast control channel (PBCH), and demodulation reference signals (DMRS). PBCH may also indicate also the CORESET (control resource set) used to schedule RMSI (remaining minimum system information) by gNB.

In addition, a BS may also transmit reference signals, such as channel state information-reference signals (CSI-RSs) via each of a plurality of beams associated with resources. In an example implementation, the CSI-RSs may be transmitted via a set of transmit beams that may be narrower than the beams used to transmit SSBs. The CSI-RS signals may, for example, allow a UE to measure and select a narrower beam (or transmit/receive beam pair) that may be used for communication with the BS. Although a selection of a TX/RX (transmit beam/receive beam) beam pair are described, example implementation are not limited to the case with only one transmitting beam and one receiving beam. Rather, multiple transmit (TX) beams, and/or multiple receive (RX) beams may be selected or used to transmit and receive, respectively. For example, at a transmitter, the selected TX beam may correspond to a pair of cross-polarized beams (two physical beams instead of one), or may also use multiple TX beams, e.g., transmitted towards different directions. At a receiver, RN hardware capabilities may dictate or determine (and loading situation) how many receive(RX) beams can be used to receive certain signal(s) at certain time instant.

According to an example implementation, after performing synchronization and establishing a connection to a BS based on a received SSB(s), a UE may then receive channel state information-reference signals (CSI-RSs) from the BS. A UE may measure a signal parameter, such as a RSRP (reference signal received power), of a CSI-RS received via one or more beams associated with predefined CSI-RS resources, and may select a best or strongest (highest measured received power) of one of the CSI-RSs (thus, selecting a best or strongest CSI-RS resource and associated beam).

According to an example implementation, idle mode UEs may scan cells to which they might connect to, monitor and receive SSB blocks and relevant information about the cell, and synchronize to receive downlink signal; SSB might be transmitted with certain beams, and multiple beams, carrying a different SSB (synchronization signal block). The UE part 332 may establish a radio connection via cell access, such as via RACH (random access procedure) or RACH-less procedure, for example. During initial access (cell access), a UE (or UE part 332) selects a random access (RA)

preamble based on (or corresponding to) a best SSB (e.g. a synchronization signal block that has a strongest measured reference signal received power (RSRP)), and transmits a RA preamble (associated with the SSB), which indicates the best SSB resource (a best SSB beam(s)) for the UE part 332. The BS may also know of a spatial quasi-colocation (e.g., based on a beam overlap, where SSB resource and CSI-RS resources share some spatial characteristics) between a wide SSB beam, and a set of narrower channel state information-reference signal (CSI-RS) beams. After establishing a connection, a UE may receive different CSI-RS signals (each associated with a different CSI-RS beam). UE (or UE part 332) may select a best beam TX/RX pair based on CSI-RS signals; and then the UE sends beam report to the BS to indicate the preferred or best CSI-RS beam(s). In some cases, the beams associated with SSB signals may be wider (and thus less precise) than the beams associated with CSI-RS signals. Thus, increased signal gain may be obtained by applying beamforming at the UE and BS that uses the narrower/more focused CSI-RS beams (or transmit/receive beam pair), as compared to used a wider SSB beam.

BS part 334 of the RN 330 (RN-BS part) may provide BS functions to serve the UEs in the RN cell, which may include, for example: RN cell broadcasting: Synchronization signals (SSB), system information (SI), paging, etc.; connection control of the UEs in the RN cell; acting as a serving BS (or donor BS) to RN in case of multi-hop relaying; communication with the other BSs over the Xn (or X2) interface; connecting to the core network (CN), 150 (FIG. 2). A donor BS may include a wired connection to the core network 150, whereas a RN typically may not have a wired connection to the CN 150.

The Xn interface 360 may be provided between the RN 330 and DgNBs (BSs) or other RNs may be provided physically over the Uu interface among other data or signaling but otherwise the same Xn signaling and procedures between the RNs/gNBs may be supported. Control signals may be exchanged over Xn interface 360 in order to perform a handover of self-backhaul connection from BS 310 (and Uu interface 340) to candidate BS 320 (and Uu interface 350).

Figure 4:
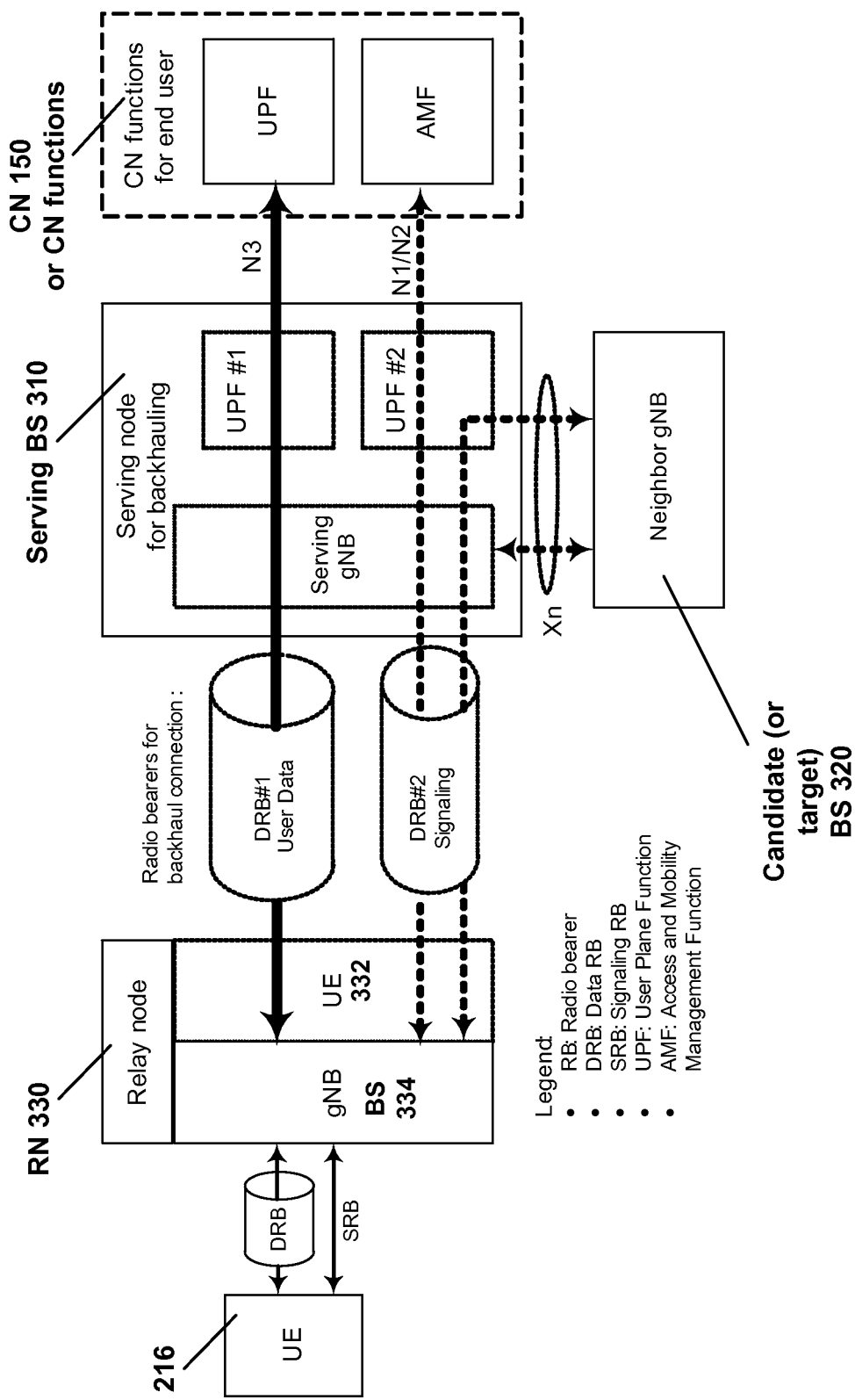
FIG. 4 is a diagram illustrating a wireless network according to another example implementation.

FIG. 4 is a diagram illustrating a wireless network according to another example implementation. Example implementations may be applicable with a layer 3 or L3 (or full stack) solution where the backhaul may be a connectivity service (which may use a separate network slice, for example) through which the end user (or UE) data and signaling are transferred. In FIG. 4, the block(s) with dotted lines are the functions/blocks handling the backhauling, including:

1) A serving gNB (serving BS) 310, in this case Donor gNB with wired connection to the core network (CN) 150;

2) UE part 332 of the relay node (RN) 330: Has established connection with the serving gNB/serving BS 310 and (in this example) has two data radio bearers (DRBs), DRB#1 for user data and the other DRB#2 for signaling; both core network CN signaling (N1/N2) and RAN (Xn) signaling are shown.

3) User plane function (UPF): This may be provided in a full stack solution where the end user data and signaling (e.g., Xn signaling) between RAN nodes, such as between RN-BS part 334 and a "neighbor" (or candidate) gNB/BS 320, may be transparent to the backhaul functions.

4) The UPF functions (UPF#1, UPF#2) shown in the serving BS 310 may be logical functions and may reside physically in different places, subject to choice for the network architecture.

In addition, with reference to FIG. 4, signaling may also be transferred through a data bearer of the backhaul connection being transparent data for the backhaul functions, similarly to the end user data. Also, the serving gNB/BS 310 may also serve UEs in its own cell but for simplicity, these are not shown in FIG. 4. Similarly, there may be N2/N3 connections from the serving gNB/BS 310 to the CN 150 (and may be N1 connection between AMF and a UE in the serving gNB/BS cell). There may be multiple DRBs established for the backhaul (BH) connection also for UP (user plane) data, e.g., to have separate bearers for different QoS classes.

According to an example implementation, it may be desirable for a RN to have up-to-date information about alternative connections (e.g., candidate BSs/cells) for the case that the active backhaul link(s) fail. Thus, to allow and fast and reliable handover (or connection to a new candidate BS for the BH link) the RN 330 may monitor neighboring/candidate cells/BSs (either served by a gNB/BS with wired connection, or by another RN) in a similar way as the mobile users (UEs) monitor other BSs for mobility purposes. The difference is that RNs are stationary (corresponding to normal base stations as RNs serve typically their own cells) and the need to change (or perform a handover for a) backhaul link is not due to actual mobility of RN (in most cases), but rather typically due to changes in the environment, e.g. some obstacles moving the LOS (line of sight) of the backhaul (BH) link (especially when operating at millimeter wave frequencies, for example). Despite the static nature of the backhaul connections, the changes can be fast in the radio connection. Therefore, it may advantageous for the RN to be able to quickly react to a link failure (or a significant drop in RSRP of signals received from the serving BS) for the self-backhaul link, by performing a handover or a connection to a neighbor or candidate BS to re-establish the self-backhaul link.

According to an example implementation, to be able to have fast recovery for any connection failure, the relevant information about the candidate links may be collected while the connection with serving BS is good (or at least above a threshold RSRP). Furthermore, in order to improve (e.g., maximize) the link budget as early as possible on the new backhaul connection, the antenna beam gains should be improved (e.g., maximized), which may include selection of a best possible narrow beam pair(s) (e.g., CSI-RS beam pair). The selection of a narrow beam (or narrow beam pair) may be done, preferably, either before the link change or latest during the access procedure while establishing the backhaul link over the new connection. This in turn will call for possibility to monitor (narrow) beam specific signals (e.g., CSI-RS signals) which are typically configured separately for the UEs (UE-specific CSI-RS signals may be configured for a UE, and then transmitted, over beams configured for the UE). One illustrative problem that may arise with self-backhauling is that the monitoring phase (e.g., where the UE monitors RSRP of signals received from a BS for other possible cells/BSs) can be arbitrarily long and the configuration for the reference signals (e.g., CSI-RS), as well as possible access resources, reserves radio capacity which may not be needed for longer periods of time, or could be totally wasted if the backhaul link is never changed.

In many cases, a UE may monitor wide(r)-beam SSB signals, and select a best candidate BS and best beam, and report this information to the serving BS. Cell and beam monitoring (of neighbor BSs) is typically done based on the wide(r)-beam SSB signals. As noted, a higher antenna gain may be provided through the use of the narrower beam CSI-RS beams, based on the UE measurement of CSI-RS signals, and reporting a best CSI-RS beam of the candidate BS to the serving BS during the monitoring phase (e.g., before handover request has been issued to the candidate BS and a handover command issued by the candidate BS and forwarded to the UE). Thus, for example, during a typical monitoring phase, a UE may receive and measure a signal parameter (e.g., RSRP) and then reporting the RSRP and best beam of received signals from candidate BSs/cells to a serving BS, is typically based on the wide(r)-beam SSB signals, which does not offer the antenna gain of the narrower CSI-RS beams. Typically, when a handover is triggered by a measurement report related to SSB RSRP of candidate BS (which may cause a handover request to be sent by serving BS to candidate BS, to begin the handover phase and end the monitoring phase for UE), the serving BS/cell may send a handover request to candidate/target BS/cell and this initiates configuration and transmission of UE-specific CSI-RS transmission from candidate/target BS/cell.

Thus, during the monitoring phase (before handover has been requested by serving BS based on SSB measurement report and/or before a handover command has been received by the UE), the UE is not (yet) connected to the candidate/target BS, and may perform a target cell/candidate BS signal measurement based on received (e.g., typically wide(r)-beam) SSBs from that target cell. Because the UE has not yet established a connection with the candidate BS, the UE is unable to request or receive narrow beam UE-specific CSI-RSs during monitoring phase. Thus, during the monitoring phase (e.g., prior to handover phase, such as prior to the UE receiving a handover command), a UE typically does not (yet) have a connection to the candidate (neighbor) BS. Thus, during the monitoring phase, and prior to the handover phase, a UE is typically unable to request configuration and transmission of the UE-specific CSI-RS signals, and therefore is unable to receive the CSI-RS configuration and CSI-RS signals from the candidate BS. Thus, cell access by the UE may, for example, be performed using the (e.g., wider and less precise, with lower antenna gain) best SSB beam. In some cases, the use of a wider SSB beam for cell access (e.g.; random access procedure) with the new candidate BS/cell may lead to a delay in performing the handover and/or an increased probability of a failed or lost connection during the handover attempt, due to a lower antenna gain that may be provided by beamforming via the selected (e.g., best) SSB beam or beam pair. Thus, at least in some cases, such a delay in handover to a candidate BS/cell may lead to a dropped or lost self-backhaul connection for a relay node (RN) in the event the current backhaul connection to the serving BS fails or is lost.

Therefore, according to an example implementation, a RN-UE part 332 may receive a CSI-RS configuration and on-demand reference signals (e.g., CSI-RS signals), from a candidate BS/candidate cell 320 during a monitoring phase and before a handover phase for the UE (e.g., before the candidate BS has sent a handover request/acknowledgement and/or before the UE has received a handover command from the serving BS with respect to the candidate BS/cell). For example, RN 330 (e.g., RN-BS part 334) may send, via Xn connection with candidate BS 320, a request for transmission of reference signals (e.g., a request for UE-specific CSI-RS signals and a request for an associated reference signal configuration). A typical UE, during a monitoring phase (prior to establishing a connection to the candidate BS) is unable to request reference signals.

However, because the RN 330 includes both a UE part 332 (e.g., which may be used for establishing the backhaul connection to the serving BS), and a BS part 334 (e.g., which may be used for communicating, via Xn connection 360, with other BSs, such as to request UE-specific reference signals from candidate BS 320), RN 330 may be able to request and then receive reference signals (e.g., CSI-RS) from a candidate BS 320 during a monitoring phase and before a handover phase of the RN (e.g., before handover of the RN-UE part 332 and backhaul connection from serving BS 310 to candidate BS 320 and/or before a connection has been established with candidate BS 320). This may allow improved reliability during handover of the backhaul connection because the RN 330 may perform cell access to the candidate BS 320 via a best or strongest CSI-RS beam, which may provide improved antenna gain or performance, as compared to use of a SSB beam that is wider than the CSI-RS beam, for example.

Therefore, the UE part 332 of RN 330 can receive the CSI-RS narrow beam signals during monitoring phase with target/candidate BS/cell 320, based on Xn logical connection between RN-BS part 334 and the candidate/target BS 320. Thus, for example, in response to candidate/target BS/cell 320 receiving a request for references signals from RN-BS part 334, the candidate/target BS 320 may signal or send, over Xn logical connection, to RN-BS part 334 a reference signal configuration (e.g., CSI-RS configuration) for reference signals (e.g., for CSI-RS signals) that will be transmitted by candidate/target BS 320 via a radio/wireless channel to the RN-UE part 332. The RN 330 may then use the reference signal configuration to receive, by the RN-UE part 332, the reference signals from the candidate BS 320, and a signal parameter (e.g., RSRP) may be measured for one or more reference signals, and a best beam(s) (e.g., strongest reference signal and associated beam) may be determined by the RN 330. According to an example implementation, a reference signal (e.g., CSI-RS configuration) may include, e.g., a periodicity of the reference signals, a slot offset, an indication of time-frequency resources that are used to transmit the reference signals (e.g. within a slot), a CSI-RS antenna port, and an indication of the transmit beams for the reference signals (for the CSI-RSs). Some of the parameters included within the reference signal (e.g., CSI-RS) configuration may be based on information provided by the RN 330 (e.g., such as a best SSB beam/SSB resource, which may overlap with a set of CSI-beams/resources, based on spatial quasi-colocation between the SSB and CSI-RS resources/beams) or may be based on a previous CSI-RS measurements/reports (or indications) previously provided by RN 330, e.g., identifying a best CSI-RS beam (e.g., a CSI-RS signal having a strongest/highest RSRP, for example).

Monitoring phase: prior to handover, the RN obtains current information for best beam(s) of a target cell, which then may be used as a starting point (using this beam pair for cell access) if current connection to the serving cell is broken and a HO is performed to target cell; RN is determining RSRP of a set of beams (to determine strongest beam or quality of RS) for each of one or more candidate or target BSs, so it can initiate a HO.

In order to improve RRM (radio resource measurement) measurements for the self-backhaul link changes, a number of features may be used or provided, so as to improve the reliability and performance of a handover of the backhaul link from serving BS to a candidate BS, for example:

The RN-BS part 334 may communicate directly with the (detected) neighboring gNBs (candidate BSs) or other RNs (gNB/BS parts) over the (partly wireless, over BH link) Xn interface;

The Xn connection from RN BS part 334 may be set up to each cell of n-cells can be set up whenever the cell has been detected by the RN-UE part 332 (n-cell monitoring);

Because BS part 334 of RN 330 has established a Xn logical connection to each target/candidate BS, the RN-BS part 334 initiates cell measurements for RN 330 by instructing (by sending a reference signal request message over the Xn connection to a candidate BS 320) one or more neighboring BSs/RNs (BS parts) to send appropriate reference signals to the RN 330;

Reference signals can be beam-specific enabling beam refinement while measuring the cells;

Neighboring BSs may configure requested reference signals according to the RN instructions (e.g., based on the reference signal request received from RN-BS part 334), and signal the actual reference signal configuration(s) (e.g., CSI-RS configuration) back to RN-BS part 334 over Xn connection (message over Xn wireless connection); and then candidate BS 320 may transmit the reference signals to RN-UE part 332;

RN 330: Backhaul link is the radio bearer or link between RN 330-UE part 332 and serving BS 310; Thus, user data from RN 330 to core network 150 may be sent via the wireless backhaul (BH) link to serving BS 310;

Radio bearer(s) may be established for RN 330; used for both Xn interface between RN-BS part 334 and serving BS 310 and candidate BS 320; and these radio bearer(s) may be used for the backhaul link from RN-UE part 332 and serving BS; Also, radio bearer(s) may be used for Xn connections to other/target BSs. Radio bearer(s) may be shared for backhaul link and Xn connection, for example.

Neighboring/candidate (target) BS/RN (BS part) transmits the reference signals according to the signaled configuration(s) and possibly in response to the dynamic (such as dynamic triggering) reference signal request received from RN-BS part 334 at any point of time;

Transmission of the reference signals may be periodic, semi-persistent (activated/deactivated by MAC CE (media access control element) and/or DCI (downlink control information)) or aperiodic (triggered by DCI and/or MAC CE);

RN-UE part 332 measures (e.g., measures RSRP or other signal parameter) of the configured reference signals and updates the n-cell and beam related information per each candidate cell (e.g., including a selected or best CSI-RS beam for each candidate BS/cell);

RN-UE part 332 may perform beam refinement also for receive (RX) beams and can determine the best transmit/receive (TX/RX) beam pair for possible connection setup (cell access request, such as RACH request) for each of one or more candidate cells via the best/strongest CSI-RS beam, for example;

The procedure above can be repeated in regular intervals corresponding to anticipated changes in the radio links, or based on the ongoing procedure. The request by the RN, to transmit reference signals may be valid until the RN requests to stop the reference signal transmission. The interval can be configured, or it can be decided by the RN 330 and/or DgNB transmitting the CSI-RS; RN may utilize earlier measurement results and the changes in there to adjust the measurement frequency. Also, the (number of) reference signal (e.g., CSI-RS) beams used to transmitting reference signals to UE may be reduced if earlier measurement results are available.

During the handover procedure when the HO preparation has been done, the initiation of the measurements can be different from the n-cell monitoring case; e.g. the interval can be shortened to guarantee the availability of latest information about the radio conditions. There can be variations with the described procedure above and not all features are mandatory. With the proposed enhanced operation, RN can obtain sufficient knowledge about the available alternative connections for the BH link with minimized impact on radio interface capacity and signaling.

Figure 5:
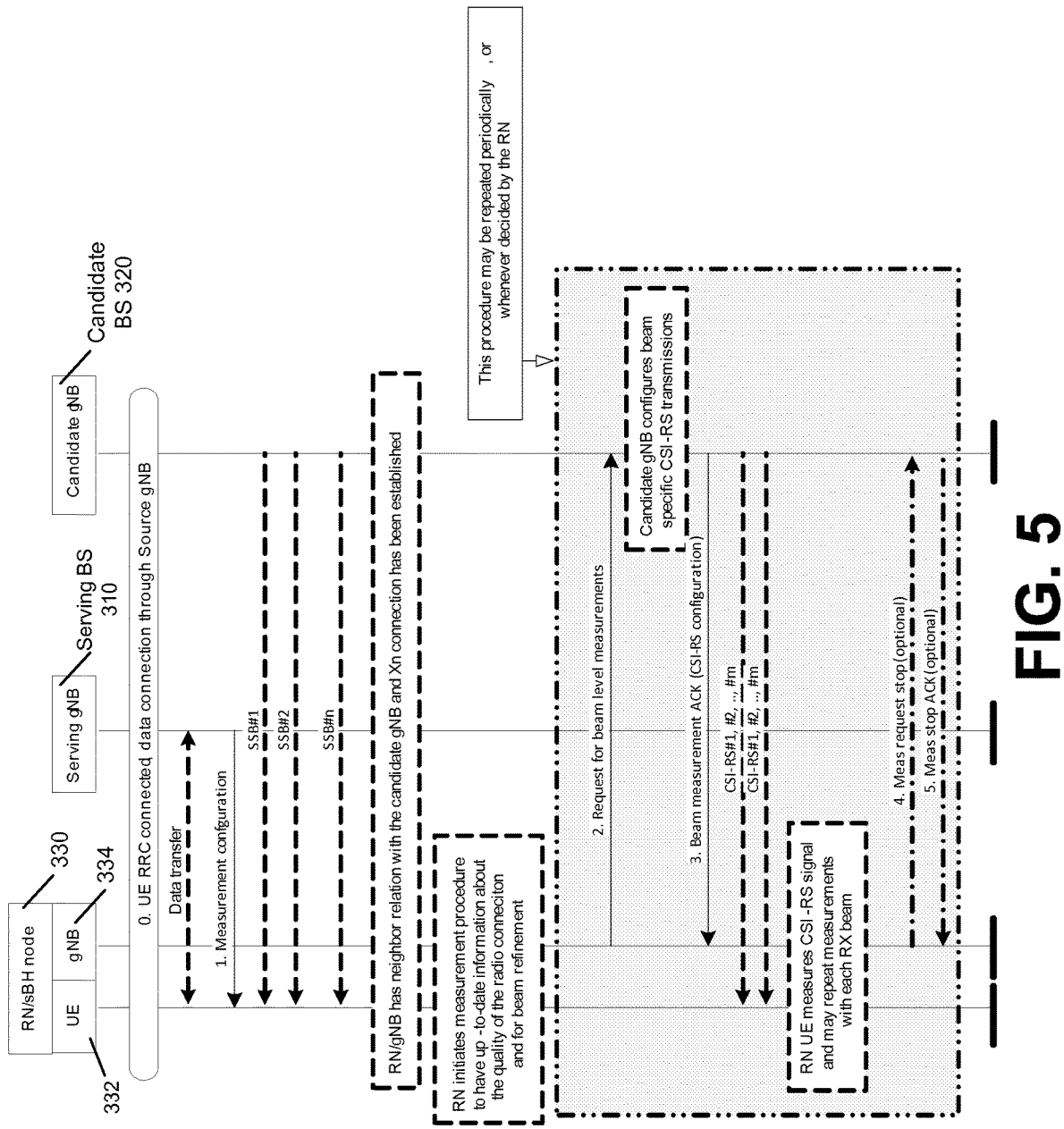
FIG. 5 is a diagram illustrating operation of a wireless network according to an example implementation.

FIG. 5 is a diagram illustrating operation of a wireless network according to an example implementation. At (0), RN-UE part has a backhaul connection established with serving BS 310, and an Xn connection established between RN-BS part 334 and serving BS 310. At (1), RN-UE part 332 receives a measurement configuration request that may request the RN-UE part to measure signals from one or more neighbor/candidate BSs, such as candidate BS 320. The RN-UE part 332 may then receive and measure one or more SSB signals (via associated SSB beams), e.g., to determine a best SSB beam for the candidate BS 320. Thus, in an example implementation, with reference to FIG. 5, an initial state is where the backhaul connection has been established between the RN 330-UE part 332 and serving (Donor) BS 310, and there is a neighbor relation between RN 330 and neighbor/candidate BS 320, and, an Xn connection has been established between RN-BS part 334 and candidate BS 320.

Neighbor/candidate BS/cell 320 broadcasts SSBs (synchronization signal blocks) with a configured interval and the UEs (and UE part of RNs) can use those for cell detection and mobility measurements. SSB transmission can be sent with wider beams than the beams used for data connections (e.g., CSI-RS beams). Therefore, SSB level measurements, at least in some cases, may not be sufficient to achieve full antenna gain especially at the transmit (TX) end (at transmitting node). Furthermore, SSB transmission may not have sufficient means, such as TX beam repetition, for adjusting RN receive (RX) beams for achieving full antenna gain at the RX end (at receiving node). For possible backhaul link change to the neighbor cell, it would be beneficial for RN to have (narrow) beam level information prior to the link change (prior to handover of backhaul link from serving BS 310 to candidate BS 320).

To obtain narrow beam-level information (e.g., determine a best/strongest CSI-RS beam(s)), RN 330 may initiate a measurement procedure by sending (from RN-BS part 334) a request (2) (e.g., beam level request or reference signal request) via Xn interface to the neighbor/candidate BS 320 (or to multiple candidate BSs) to request the configuration and transmission of beam specific reference signals. The reference signals may be, e.g., CSI-RS signals. CSI-RSs may be transmitted using resources reserved for DL (downlink) backhaul, for example. At (3), a beam level measurement acknowledgement may be sent by the candidate BS 320 via Xn connection to the RN-BS part 334.

At (3), a beam level measurement acknowledgement may include the reference signal configuration (e.g., indicating time-frequency resources, periodicity, beam(s), etc. that will be used to transmit the requested reference signals) of the reference signals that will be transmitted to the RN-UE part 332. The CSI-RS configuration, and transmission of associated CSI-RS signals, may be valid for a certain period of time or until explicitly released (e.g., until explicitly terminated based on a message sent by the RN-BS part 334 to the candidate BS 320, see message (4) in FIG. 5). Thus, as shown in FIG. 5, the candidate BS 320 may send/transmit the CSI-RS signals, via one or more transmit (TX) beams, such a by transmitting CSI-RS#1 (e.g., via TX beam 1), CDI-RS#2 (e.g., via beam 2, . . . ) . . . CSI-RS#m (e.g., via beam m), and this transmission of a set of m CSI-RS signals via a corresponding TX beam may be repeated, e.g., a certain number of times, for a certain period of time, or until explicitly terminated or released by the RN 330. RN-UE part 332 may receive the reference signals, and measure one or more parameters (e.g., received power or RSRP) of the reference signals to determine the best or strongest reference signal (and thus determine the best associated beam or TX/RX beam pair).

For explicit release, RN 330-BS part 334 may send, e.g., via Xn connection, a measurement request stop indication (or reference signal stop indication) to candidate BS 320 to cause the candidate BS 320 to stop or terminate transmission of the requested reference signals to the RN 330, for example. In response to receiving the measurement request stop indication at (4), at (5) the candidate BS 320 may send/transmit, e.g., via Xn connection to RN-BS part 334, a measurement stop acknowledgement (Ack) and stop or terminate transmission of the CSI-RS signals.

While measuring the neighbor cell CSI-RS signals, the RN-UE part 332 may repeat the measurements using multiple receive (RX) beams in order to identify a best TX/RX beam pair(s) (e.g., a best transmit beam used by candidate BS 320 to transmit reference signals, and a best receive beam used by RN-UE part 332 to receive the reference signals) over the radio link (RN 330 may operate with relatively narrow beams in both backhaul and access link. Hence, it may have a high number of receive (RX) beams compared to that of a regular/mobile UE). The beam pair information can be utilized in the subsequent access signaling in case the backhaul is changed to that cell. By RN 330 requesting, and the candidate BS 320 providing, the on-demand reference signals, this may decrease resources used to transmit the reference signals and allows improved (e.g., maximum) antenna gains, at both ends of the link, from the very beginning of the connection establishment, such as beginning with the access request that may be sent by RN-UE part 332 to candidate BS in order to establish a connection to be used for the backhaul connection. The cell access by RN 330 to candidate BS 320 is not shown in FIG. 5, as part of handover execution (see, e.g., FIG. 6).

This reference signal transmission and measurement of (e.g., on-demand) reference signals (e.g., CSI-RSs) may be repeated and/or may last only a short period of time. The direct Xn connection (e.g., over wireless link) between RN 330-BS part 334 and the candidate BS/cell 320 allows communication between RN 330-BS part 334 and candidate BS 320, e.g., to allow a request for the reference signals to be sent, and to allow the RN 330-BS part 334 to receive a reference signal configuration, so that the RN-UE part 332 may receive the reference signals from the candidate BS 320 and determine a best (e.g., strongest) narrow (e.g., CSI-RS) beam or beam pair for communicating with the candidate BS in the event the RN 330 may need to establish a new connection to handover the backhaul link from serving BS 310 to candidate BS 320. UE part 332 and BS part 334 of RN may be provided on or as part of RN 334. This technique may allow for a control of used transmit TX resources (e.g., TX beam) and measurement time. Also, neighbor/candidate cell measurements of different n-cells may be time multiplexed, facilitating the operation of the RN-UE part 332, for example.

Some Example Advantages (by way of Illustrative Example):

Reduced use and/or reservation of radio resources for reference signals to be used for cell measurements;

Measurement intervals can be adapted to estimated rate of change of the radio conditions;

Measurement frequency can be based on the ongoing procedure to provide more accurate and up-to-date results in critical cases, like during an ongoing handover procedure, or when signal conditions at serving BS (for backhaul link) may begin to deteriorate;

Thus, in an example implementation, there is no need for serving cell/serving BS 310 to be involved in the on-demand reference signal transmission and measurement procedure (because the reference signal request sent by RN-BS part 334, and reply from candidate BS 320 with reference signal configuration may be exchanged directly over Xn logical interface between RN-BS part 334 and candidate BS 320). Thus, the use of dual functionality of the RN 330, which includes both BS part 334 and UE part 332 (with in on RN), may allow the RN 330 to request and obtain reference signals configuration and thus receive reference signals from a candidate base station during a monitoring phase, prior to a handover phase (e.g., before a handover request is transmitted or received and/or before a connection is established between RN and candidate BS), to allow more accurate narrow beam(s) (instead of wider SSB beams) to be selected and used for cell access/initial access to candidate BS 320 to establish a new connection (with candidate BS 320) for backhaul link for RN 330. This may improve e.g. reliability for handover of (including establishing a new connection for) the backhaul link. In at least some example implementations, a serving BS may be made aware of the measurements (e.g., RSRP) related to (or for) non-serving BSs/RNs. This measurement information for non-serving BSs/RNs may be beneficial, e.g., in terms of backhaul resource allocation (e.g., because a RN may not be able to communicate via BH link at that time).

The self-backhauling may be able to react to any deterioration of the BH link as it will affect the service quality of all UEs in the RN cell as well as the connection over another backhaul hop to the following RN, in case of multi-hop deployment. The RN may be connected to the best possible Donor cell (or upstream RN node in multi-hop case) to maintain the normal operation in the RN cell.

Figure 6:
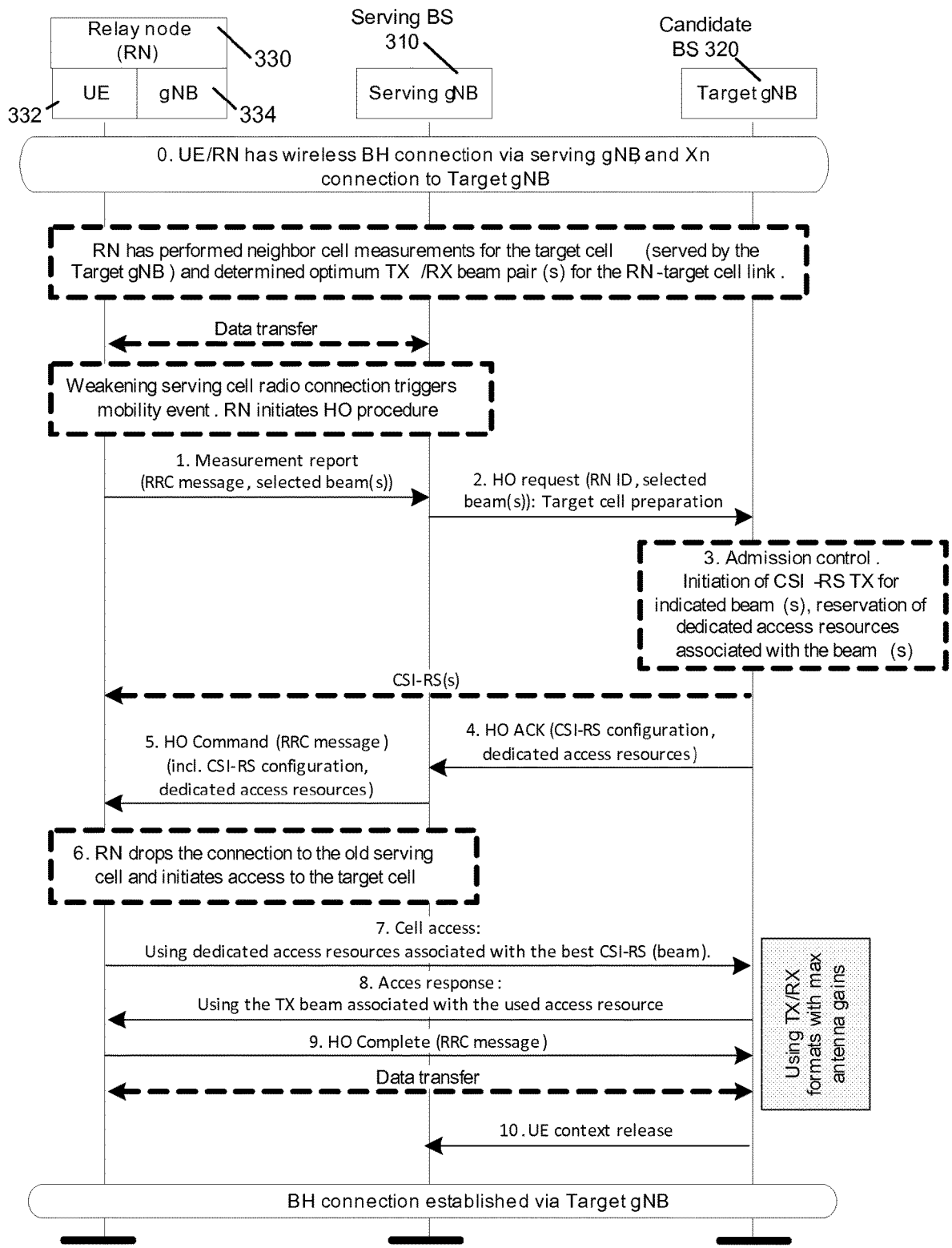
FIG. 6 is a diagram illustrating a handover procedure for a relay node backhaul link in which narrow beam-specific information is used for cell access according to an example implementation.

FIG. 6 is a diagram illustrating a handover procedure for a relay node backhaul link in which narrow beam-specific information is used for cell access according to an example implementation. In FIG. 6, the beam-specific information, such as specific narrow beam (e.g., beam or beam pair) (or generally optimized transmit signal formats and reception methods) obtained by a RN 330 during the on-demand reference signal transmission and measurement procedure of FIG. 5 may be used by RN 330 to improve handover reliability for the backhaul link for the RN 330. Thus, the beam refinement (e.g., measuring and selecting a narrow beam, such as a CSI-RS beam) performed prior to cell access) illustrated in FIG. 5, for example, instead of performing beam refinement during the target cell access, may allow use of a narrower higher antenna gain beam during the initial access (e.g., for transmission of cell access request or RACH request), and thereby improve HO reliability.

FIG. 6 will be briefly described. At an initial state: The RN330 has an established radio connection to the serving cell/serving BS 310 carrying BH data. Over the same link there is a Xn connection to the target/candidate cell/BS 320. According to an example implementation, the RN 330 has carried out a neighbor cell monitoring procedure (e.g., see FIG. 5) with the candidate cell(s) utilizing the Xn connection to trigger beam specific reference signal transmission, carrying out the measurements on those and selecting beam pair(s), and selecting a best/strongest narrow (e.g., reference signal) beam to provide improve antenna gain during handover and/or cell access to the candidate BS/cell 320. The resulting information can be utilized in the procedure(s) for changing the BH connection in case the serving cell connection is weakening and do not provide sufficient quality for the BH connection. The signaling shown in FIG. 6 illustrates an example of how the BH link can be changed, in this case using a HO signaling procedure.

An example implementation of the operation of FIG. 6 may include the following:

(1) A weakened or worsening connection quality on the serving cell/serving BS 310 link (e.g., detected based on measuring RSRP of reference signals from the serving BS 310) causes or triggers a measurement report to be sent by RN-UE part 332 to the serving BS/cell 310. The measurement report includes information about a selected beam(s), such as an indication or index of the best (e.g., strongest) TX beam (or beam pair) of the target cell/candidate BS 320 determined from the CSI-RS measurements during the monitoring procedure of FIG. 5.

(2) Serving BS 310 (e.g., which is the source BS in the HO procedure) sends a HO request to the indicated target BS/candidate BS 320 including also the information about the CSI-RS result (preferred CSI-RS beam or beam pair). For example, the HO request sent to the candidate/target BS may include a RN ID, an indication of the selected/best beam(s), and other information.

(3) Target/candidate BS 320 performs admission control for the RN 330, based on the HO request. For example, candidate BS 320 may configure CSI-RS transmission corresponding the measurement scenario for the RN 330. The candidate/target BS 320 may check also the load of the cell to determine whether the new user can be admitted to the cell; in this case the admission control is passed. One or multiple CSI-RS (beam) transmissions can be activated. The target gNB reserves also dedicated (random) access resource in the target cell. The candidate BS 320 then transmits the reference signals (CSI-RSs) according to the configuration.

(4) The target BS 320 sends a HO acknowledgement to the source cell/serving BS 310. The HO acknowledgement may include the CSI-RS configuration and indicates the dedicated access resource(s) or dedicated resource reservation for initial access to the candidate cell/candidate BS 320. The access resources may be contention-less resources (dedicated to the UE doing HO) and associated with the CSI-RS signals (beams).

(5) The serving BS 310 sends a HO command as a RRC (radio resource control) message to the RN-UE part 332 carrying also the received information about the CSI-RS configuration and the access resource reservation. RN-UE part receives HO command via the serving cell/serving BS 310. The HO command includes the CSI-RS configuration and the dedicated (non-contention) access resources which are associated with the configured CSI-RS signals (beams).

(6) RN drops the connection to the old cell (serving cell/BS 310) and initiates access procedure in the target cell/candidate BS 320.

(7) The RN-UE part 430 uses the dedicated access resources associated with the best selected CSI-RS (beam) to send an access request, such as a random access request or other access request, to the candidate cell/BS 320. The access signal may be transmitted without doing any CSI-RS measurements at this point minimizing the HO execution time. Normally the access is done by sending a random access signal (on PRACH, physical random access channel). Used access resources correspond to the best CSI-RS signals. RN 330 can use the TX beam corresponding to the best RX beam determined in the measurement phase; this can be done assuming reciprocity of the RX/TX beams in the RN, for example.

(8) The target cell/candidate BS 320 sends back an access response (e.g. RAR, random access response) using the beam corresponding to the used access resources by the RN 330. Hence, improved signal quality may achieved both directions already from the start of the access procedure, e.g., based on the on-demand reference signal transmission and measurement procedure to determine a best/strongest narrow (e.g., reference signal) beam, which may be used during initial access to candidate BS to improve HO reliability for the BH link.

(9) RN-UE part 332 replies with HO complete on RRC layer to target cell/candidate BS 320. The new link to the target cell/candidate BS 320 is ready for data transmission.

(10) The target/candidate BS 320 sends a context release message to the serving BS 310 to release the connection and UE context at the source cell/serving BS 310 by sending, to complete the handover of the backhaul link (for RN 330) from the serving BS 310 to candidate BS 320, for example.

Example 1

Figure 7:
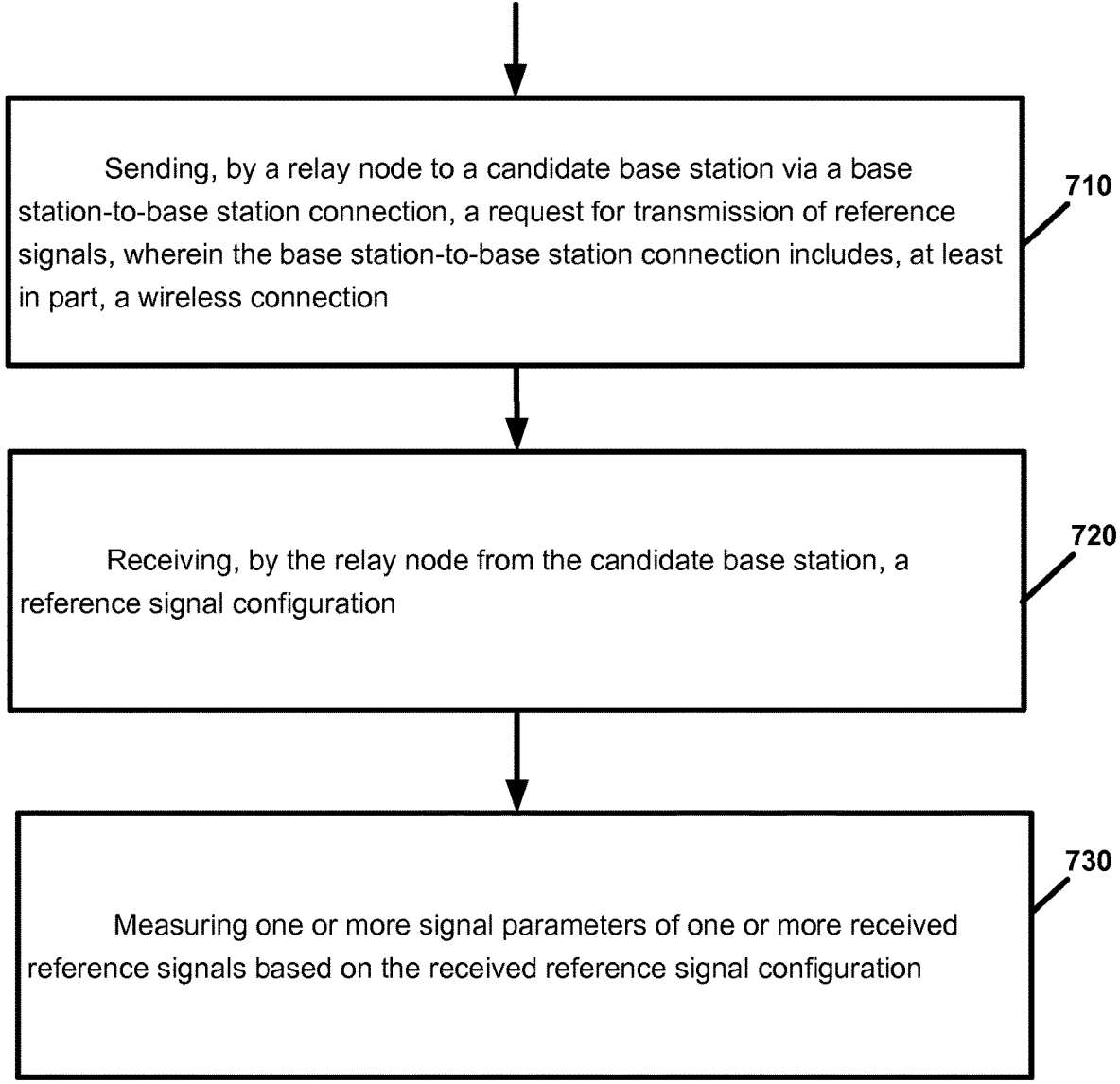
FIG. 7 is a flow chart illustrating operation of a relay node according to an example implementation.

FIG. 7 is a flow chart illustrating operation of a user device according to an example implementation. Operation 710 includes sending, by a relay node to a candidate base station via a base station-to-base station connection, a request for transmission of reference signals, wherein the base station-to-base station connection includes, at least in part, a wireless connection. Operation 720 includes receiving, by the relay node from the candidate base station, a reference signal configuration. Operation 730 includes measuring one or more signal parameters of one or more received reference signals based on the received reference signal configuration.

Example 2

According to an example implementation of example 1, wherein the receiving a reference signal configuration comprises: receiving, by the relay node from the candidate base station, a reference signal configuration that is determined, at least in part, based on a previous measurement of reference signals.

Example 3

According to an example implementation of any of examples 1-2, and further comprising sending, by the relay node to the candidate base station via the base station-to-base station connection, a request for termination of transmission of the reference signals.

Example 4

According to an example implementation of any of examples 1-3, and further comprising establishing, by a relay node, a wireless backhaul connection via a serving base station; selecting, by the relay node, a reference signal based on the measuring; performing, by the relay node based on the selected reference signal, a handover of the backhaul connection from the serving base station to the candidate base station.

Example 5

According to an example implementation of any of examples 1-4, wherein the selecting comprises selecting, based on the selected reference signal, a beam pair to be used for communication with the candidate base station, the selected beam pair including a transmit beam for the candidate base station and a receive beam for the relay node.

Example 6

According to an example implementation of any of examples 1-5, wherein the selecting comprises selecting, based on the selected reference signal, a beam including at least one of a transmit beam for the candidate base station and a receive beam for the relay node.

Example 7

According to an example implementation of any of examples 1-6, wherein the reference signals comprise channel state information-reference signals.

Example 8

According to an example implementation of any of examples 1-7, wherein the reference signals comprise channel state information-reference signals, the method further comprising: selecting, by the relay node, a channel state information-reference signal and an associated beam pair, based on the measuring; performing, by the relay node, a handover of a wireless backhaul connection from the serving base station to the candidate base station based on the selected channel state information-reference signal and associated beam pair.

Example 9

According to an example implementation of any of examples 1-8, wherein the measuring one or more signal parameters of one or more received reference signals comprises measuring a reference signal received power of one or more reference signals.

Example 10

According to an example implementation of any of examples 1-9, wherein the request for transmission of reference signals is valid for a certain period of time.

Example 11

According to an example implementation of any of examples 1-10, wherein the request for transmission of reference signals is valid until the candidate base station receives a request to terminate the transmission of reference signals from the relay node.

Example 12

According to an example implementation of any of examples 1-11, wherein the measuring comprises: measuring, by the relay node, one or more signal parameters of one or more received reference signals using a plurality of different receive beams.

Example 13

According to an example implementation of any of examples 1-12, and further comprising: storing, by the relay node, one or more reference signal measurement results and corresponding beam information that identifies at least one of a transmit beam and a receive beam.

Example 14

According to an example implementation of any of examples 1-13, and further comprising: storing, by the relay node, a reference signal configuration used to receive one or more reference signals.

Example 15

According to an example implementation of any of examples 1-14, and further comprising: performing, by the relay node, a handover of a wireless backhaul connection from the serving base station to the candidate base station, including at least the following: sending, by the relay node to the serving base station, a measurement report that reports one or more best reference signals received from the candidate base station, as measured by the relay node; receiving, by the relay node, a handover command from the serving base station with respect to the candidate base station, including information identifying one or more dedicated access resources, including at least one dedicated access resource corresponding to one of the one or more best reference signals indicated by the relay node; and performing, by the relay node, cell access to the candidate base station via one of the dedicated access resources corresponding to one of the best reference signals indicated by the relay node.

Example 16

An apparatus comprising means for performing a method of any of examples 1-15.

Example 17

An apparatus comprising at least one processor and at least one memory including computer instructions that, when executed by the at least one processor, cause the apparatus to perform a method of any of examples 1-15.

Example 18

An apparatus comprising a computer program product including a non-transitory computer-readable storage medium and storing executable code that, when executed by at least one data processing apparatus, is configured to cause the at least one data processing apparatus to perform a method of any of examples 1-15.

Example 19

Figure 8:
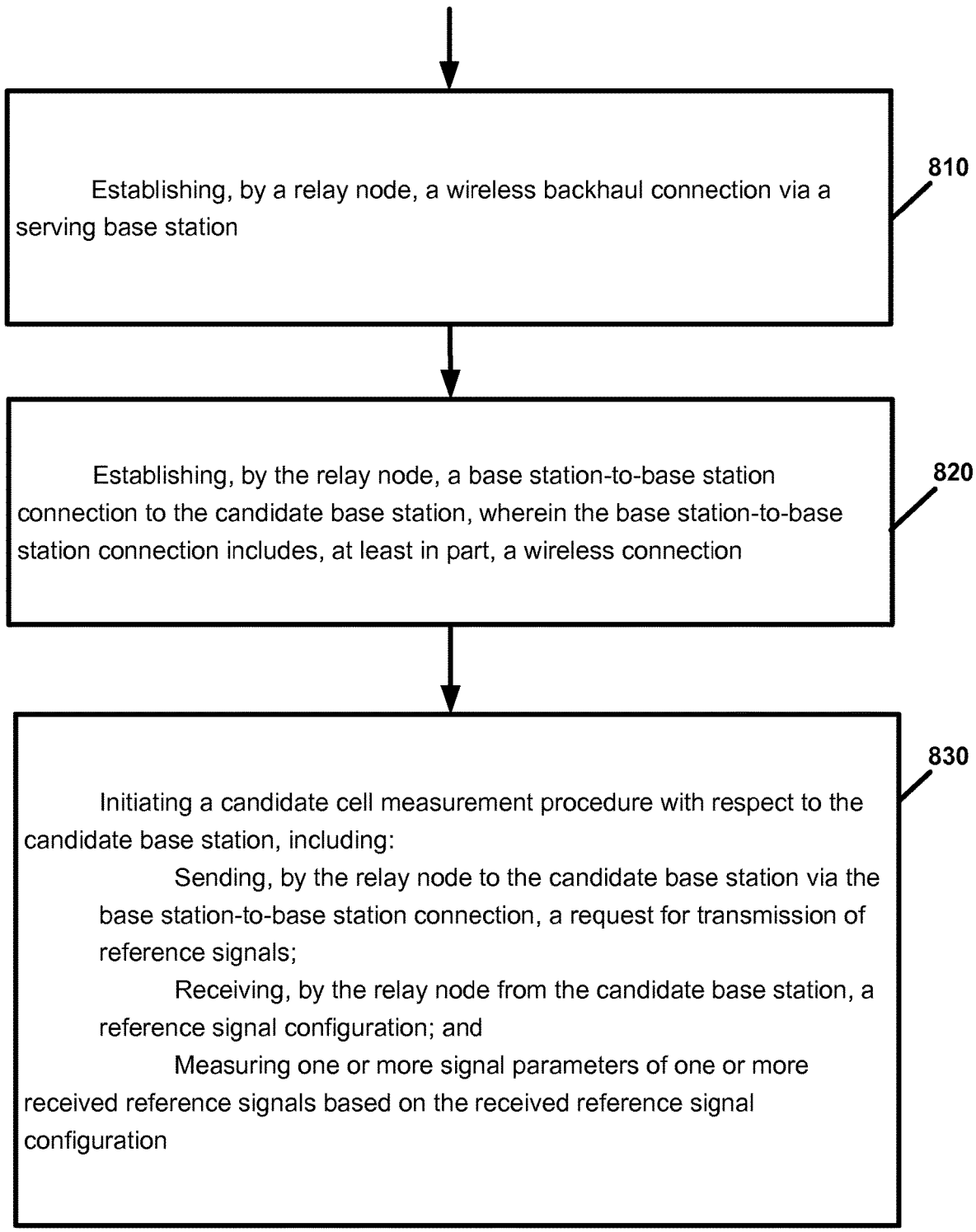
FIG. 8 is a flow chart illustrating operation of a relay node according to another example implementation.

FIG. 8 is a flow chart illustrating operation of a relay node according to another example implementation. Operation 810 includes establishing, by a relay node, a wireless backhaul connection via a serving base station. Operation 820 includes establishing, by the relay node, a base station-to-base station connection to the candidate base station, wherein the base station-to-base station connection includes, at least in part, a wireless connection. And, operation 830 includes initiating a candidate cell measurement procedure with respect to the candidate base station, including: sending, by the relay node to the candidate base station via the base station-to-base station connection, a request for transmission of reference signals; receiving, by the relay node from the candidate base station, a reference signal configuration; and measuring one or more signal parameters of one or more received reference signals based on the received reference signal configuration.

Example 20

According to an example implementation example 19, and further comprising sending, by the relay node to the candidate base station via the base station-to-base station connection, a request for termination of transmission of the reference signals.

Example 21

According to an example implementation of any of examples 19-20, and further comprising: selecting, by the relay node, a reference signal and an associated beam, based on the measuring; and performing a cell access, by the relay node based to the candidate base station, based on the selected reference signal and the associated beam, to perform a handover of the backhaul connection from the serving base station to the candidate base station.

Example 22

According to an example implementation of any of examples 19-21, wherein the selecting comprises: selecting, based on the selected reference signal, a beam pair to be used for communication with the candidate base station, the selected beam pair including a transmit beam for the candidate base station and a receive beam for the relay node.

Example 23

According to an example implementation of any of examples 19-22, wherein the measuring one or more signal parameters of one or more received reference signals comprises: measuring a reference signal received power of one or more reference signals.

Example 24

According to an example implementation of any of examples 19-23, wherein the request for transmission of reference signals is valid for a certain period of time.

Example 25

According to an example implementation of any of examples 19-24, wherein the request for transmission of reference signals is valid until the candidate base station receives, from the relay node, a request to terminate the transmission of reference signals.

Example 26

According to an example implementation of any of examples 19-25, wherein the measuring comprises: measuring, by the relay node, one or more signal parameters of one or more received reference signals using a plurality of different receive beams.

Example 27

According to an example implementation of any of examples 19-26, and further comprising: storing, by the relay node, one or more reference signal measurement results and corresponding receive beam information.

Example 28

According to an example implementation of any of examples 19-27, and further comprising: performing, by the relay node, a handover of a wireless backhaul connection from the serving base station to the candidate base station, including at least the following: sending, by the relay node to the serving base station, a measurement report that reports one or more best reference signals received from the candidate base station, as measured by the relay node; receiving, by the relay node, a handover command from the serving base station with respect to the candidate base station, including information identifying one or more dedicated access resources, including at least one dedicated access resource corresponding to one of the one or more best reference signals indicated by the relay node; and performing, by the relay node, cell access to the candidate base station via one of the dedicated access resources corresponding to one of the best reference signals indicated by the relay node.

Example 29

An apparatus comprising means for performing a method of any of examples 19-28.

Example 30

An apparatus comprising at least one processor and at least one memory including computer instructions that, when executed by the at least one processor, cause the apparatus to perform a method of any of examples 19-28.

Example 31

An apparatus comprising a computer program product including a non-transitory computer-readable storage medium and storing executable code that, when executed by at least one data processing apparatus, is configured to cause the at least one data processing apparatus to perform a method of any of examples 19-28.

Example 32

Figure 9:
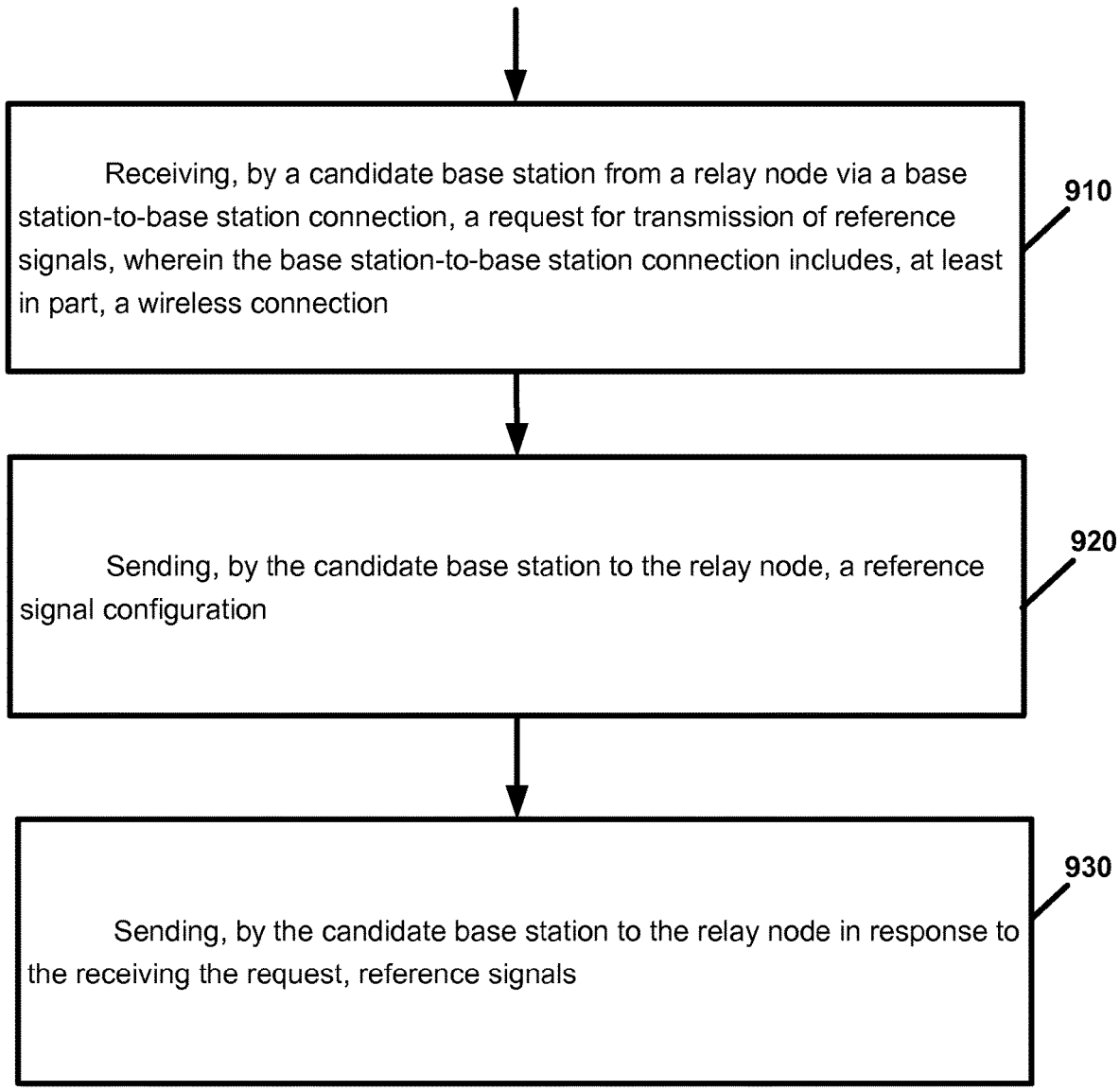
FIG. 9 is a flow chart illustrating operation of a base station according to an example implementation.

FIG. 9 is a flow chart illustrating operation of a base station according to an example implementation. Operation 910 includes receiving, by a candidate base station from a relay node via a base station-to-base station connection, a request for transmission of reference signals, wherein the base station-to-base station connection includes, at least in part, a wireless connection. Operation 920 includes sending, by the candidate base station to the relay node, a reference signal configuration. Operation 930 includes sending, by the candidate base station to the relay node in response to the receiving the request, reference signals.

Example 33

According to an example implementation of example 32, and further comprising terminating, by the candidate base station, the sending of the reference signals after a period of time has elapsed since receiving the request for transmission of the reference signals.

Example 34

According to an example implementation of any of examples 32-33, and further comprising: receiving, by the candidate base station from the relay node, a request for termination of transmission of the reference signals; and terminating, by the candidate base station, the sending of the reference signals.

Example 35

According to an example implementation of any of examples 32-34, and further comprising: receiving, by the candidate base station based on the reference signals, a request to perform a handover of the backhaul connection for the relay node to the candidate base station.

Example 36

According to an example implementation of any of examples 32-35, wherein the request for transmission of reference signals is valid for a certain period of time.

Example 37

According to an example implementation of any of examples 32-36, wherein the request for transmission of reference signals is valid until the candidate base station receives a request to terminate the transmission of reference signals from the relay node.

Example 38

According to an example implementation of any of examples 32-37, wherein the reference signals comprise channel state information-reference signals.

Example 39

According to an example implementation of any of examples 32-38, and further comprising: receiving, by the candidate base station from a serving base station that is serving the relay node, a handover request for a wireless backhaul connection for the relay node, the handover request indicating one or more best beams with respect to the relay node; sending, by the candidate base station to the serving base station, a handover acknowledgement that includes an indication of one or more dedicated resources for cell access, wherein at least one of the one or more dedicated resources correspond to at least one beam of the one or more best beams; receiving, by the candidate base station from the relay node, a cell access request, via the dedicated access resource that corresponds to one beam of the one or more best beams; sending, by the candidate base station, a handover complete message to the relay node using a transmit beam that corresponds to the dedicated access resource over which the cell access request was received from the relay node; and sending, by the candidate base station to the serving base station, a context release message to complete a handover of the wireless backhaul connection, for the relay node, from the serving base station to the candidate base station.

Example 40

An apparatus comprising means for performing a method of any of examples 32-39.

Example 41

An apparatus comprising at least one processor and at least one memory including computer instructions that, when executed by the at least one processor, cause the apparatus to perform a method of any of examples 32-39.

Example 42

An apparatus comprising a computer program product including a non-transitory computer-readable storage medium and storing executable code that, when executed by at least one data processing apparatus, is configured to cause the at least one data processing apparatus to perform a method of any of examples 32-39.

Figure 10:
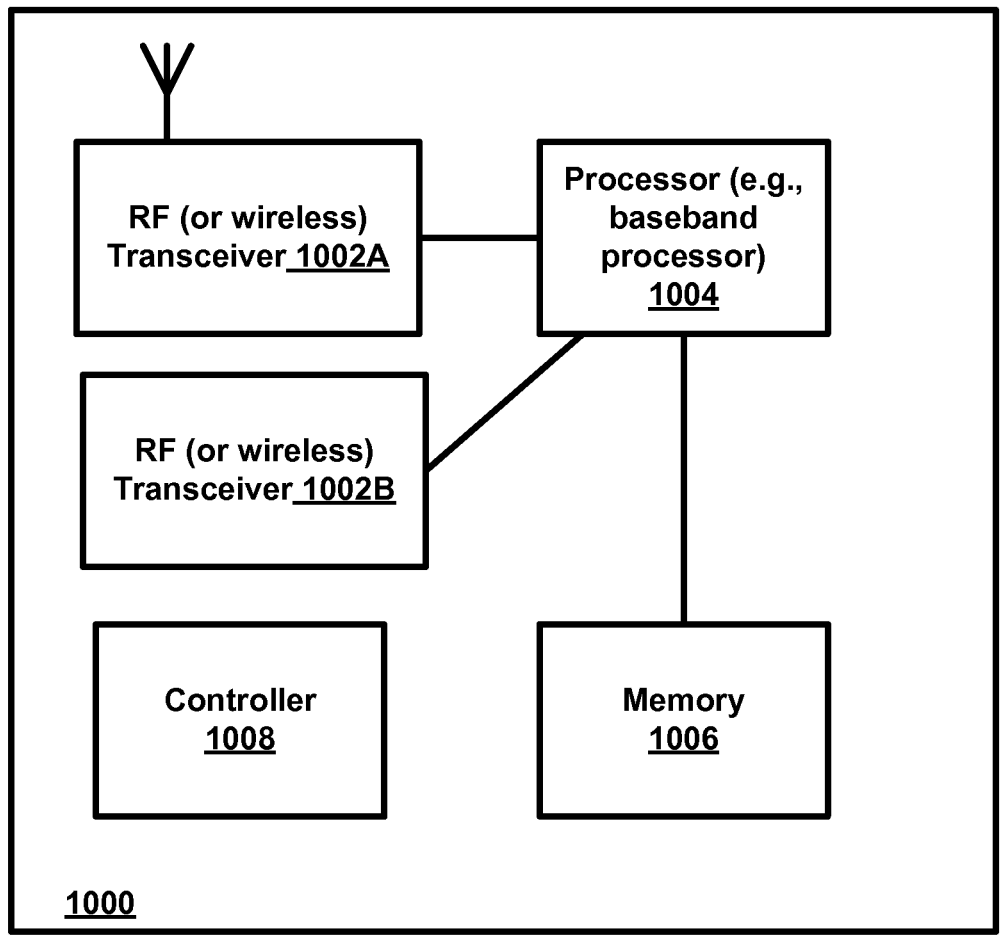
FIG. 10 is a block diagram of a node or wireless station (e.g., base station/access point, relay node or mobile station/user device) according to an example implementation.

FIG. 10 is a block diagram of a wireless station (e.g., AP, BS, relay node, eNB/gNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    sending, by a relay node or an entity comprising a relay node to a candidate base station via a base station-to-base station connection, a request for transmission of reference signals, wherein the base station-to-base station connection includes, at least in part, a wireless connection;
    receiving, by the relay node or the entity comprising a relay node from the candidate base station, a reference signal configuration;
    measuring one or more signal parameters of one or more received reference signals based on the received reference signal configuration; and
    performing a handover of a backhaul connection from a serving base station to the candidate base station based on the measuring.

2. The method as in claim 1, wherein the request for transmission of reference signals and the reference signal configuration are received over a Xn logical connection.

3. An apparatus including a relay node or an entity comprising a relay node to a candidate base station via a base station-to-base station connection, comprising:
    at least one processor and at least one memory including computer instructions that, when executed by the at least one processor, cause the apparatus to:
        send, by the apparatus to a candidate base station via a base station-to-base station connection, a request for transmission of reference signals, wherein the base station-to-base station connection includes, at least in part, a wireless connection;
        receive, by the apparatus from the candidate base station, a reference signal configuration;
        measure one or more signal parameters of one or more received reference signals based on the received reference signal configuration; and
        perform a handover of a backhaul connection from a serving base station to the candidate base station based on the measuring.

4. The apparatus of claim 3, wherein the at least one memory and computer program code are further configured, with the at least one processor, to cause the apparatus at least to:
    send, by the apparatus to the candidate base station via the base station-to-base station connection, a request for termination of transmission of the reference signals.

5. The apparatus of claim 3, the at least one memory and computer program code are further configured, with the at least one processor, to cause the apparatus at least to:
    establish, by the apparatus, a wireless backhaul connection via a serving base station; and
    select, by the apparatus, a reference signal based on the measuring.

6. The apparatus of claim 5, wherein the at least one processor and at least one memory including computer instructions that, when executed by the at least one processor, cause the apparatus to select comprises:
    selecting, based on the selected reference signal, a beam pair to be used for communication with the candidate base station, the selected beam pair including a transmit beam for the candidate base station and a receive beam for the apparatus.

7. The apparatus of claim 5, wherein the at least one processor and at least one memory including computer instructions that, when executed by the at least one processor, cause the apparatus to select comprises:
    selecting, based on the selected reference signal, a beam including at least one of a transmit beam for the candidate base station or a receive beam for the apparatus.

8. The apparatus of claim 3, wherein the reference signals comprise channel state information-reference signals.

9. The apparatus of claim 3, wherein the at least one memory and computer program code are further configured, with the at least one processor, to cause the apparatus at least to:
    select, by the apparatus, a channel state information-reference signal and an associated beam pair, based on the measuring;
    perform, by the apparatus, a handover of a wireless backhaul connection from a serving base station to the candidate base station based on the selected channel state information-reference signal and associated beam pair.

10. The apparatus of claim 3, wherein the at least one processor and at least one memory including computer instructions that, when executed by the at least one processor, cause the apparatus to measure one or more signal parameters of one or more received reference signals comprises:
    measuring a reference signal received power of one or more reference signals.

11. The apparatus of claim 3, where the request for transmission of reference signals is valid for a certain period of time or the request for transmission of reference signals is valid until the candidate base station receives a request to terminate the transmission of reference signals from the apparatus.

12. The apparatus of claim 3, wherein the at least one processor and at least one memory including computer instructions that, when executed by the at least one processor, cause the apparatus to measure comprises:
    measuring, by the apparatus, one or more signal parameters of one or more received reference signals using a plurality of different receive beams.

13. The apparatus of the claim 3, the at least one memory and computer program code are further configured, with the at least one processor, to cause the apparatus at least to:
    perform, by the apparatus, a handover of a wireless backhaul connection from the serving base station to the candidate base station, including at least the following:
    send, by the apparatus to a serving base station, a measurement report that reports one or more best reference signals received from the candidate base station, as measured by the apparatus;
    receive, by the apparatus, a handover command from the serving base station with respect to the candidate base station, including information identifying one or more dedicated access resources, including at least one dedicated access resource corresponding to one of the one or more best reference signals indicated by the apparatus; and perform, by the apparatus, cell access to the candidate base station via one of the dedicated access resources corresponding to one of the best reference signals indicated by the apparatus.

14. The apparatus of claim 3, wherein the request for transmission of reference signals is valid for a certain period of time.

15. An apparatus, comprising at least one processor and at least one memory including computer instructions that, when executed by the at least one processor, cause the apparatus to:

receive, by the apparatus from a relay node via a base station-to-base station connection, a request for transmission of reference signals, wherein the base station-to-base station connection includes, at least in part, a wireless connection;

send, by the apparatus to the relay node, a reference signal configuration;

send, by the apparatus to the relay node in response to the receiving the request, reference signals; and receive, by the apparatus from a serving base station that is serving the relay node, a handover request for a wireless backhaul connection for the relay node, the handover request indicating one or more best beams with respect to the relay node.

16. The apparatus of claim 15, wherein the at least one memory and computer program code are further configured, with the at least one processor, to cause the apparatus at least to:

receive, by the apparatus based on the reference signals, a request to perform a handover of the backhaul connection for the relay node to the apparatus.

17. The apparatus of claim 15, wherein the request for transmission of reference signals is valid for a certain period of time, or the request for transmission of reference signals is valid until the apparatus receives a request to terminate the transmission of reference signals from the relay node.

18. The apparatus of claim 15, wherein the reference signals comprise channel state information-reference signals.

19. The apparatus of claim 15, wherein the at least one memory and computer program code are further configured, with the at least one processor, to cause the apparatus at least to:

send, by the apparatus to the serving base station, a handover acknowledgement that includes an indication of one or more dedicated resources for cell access, wherein at least one of the one or more dedicated resources correspond to at least one beam of the one or more best beams;

receive, by the apparatus from the relay node, a cell access request, via the dedicated access resource that corresponds to one beam of the one or more best beams;

send, by the apparatus, a handover complete message to the relay node using a transmit beam that corresponds to the dedicated access resource over which the cell access request was received from the relay node; and send, by the apparatus to the serving base station, a context release message to complete a handover of the wireless backhaul connection, for the relay node, from the serving base station to the apparatus.

20. The apparatus of claim 15, wherein the apparatus comprises a candidate base station, or is comprised in a candidate base station.

* * * * *